(12) United States Patent
Toncelli et al.

(10) Patent No.: US 12,329,313 B2
(45) Date of Patent: Jun. 17, 2025

(54) COUNTERTOP WITH INDUCTION HOB (71) Applicant: BRETON SPA, Castello di Godego (IT)

(72) Inventors: Luca Toncelli, Bassano del Grappa (IT); Mauro Bettiol, Giavera del Montello (IT); Angelo Doni, Selvazzano Dentro (IT); Marcello Zerbetto, Padua (IT); Francesco Giannini, Fonte (IT); Fabrizio Dughiero, Padua (IT)

(73) Assignee: BRETON SPA, Castello di Godego (IT)

( * ) Notice: Subject to any disclaimer, the term of this patent is extended or adjusted under 35 U.S.C. 154(b) by 171 days.

(21) Appl. No.: 16/957,163

(22) PCT Filed: Dec. 20, 2018

(86) PCT No.: PCT/IB2018/060440
§ 371 (c)(1),
(2) Date: Jun. 23, 2020

(87) PCT Pub. No.: WO2019/130180
PCT Pub. Date: Jul. 4, 2019

(65) Prior Publication Data
US 2020/0345172 A1  Nov. 5, 2020

(30) Foreign Application Priority Data
Dec. 29, 2017 (IT) .......... 102017000150969

(51) Int. Cl.
*H05B 6/12* (2006.01)
*A47J 36/24* (2006.01)
(Continued)

(52) U.S. Cl.
CPC ........ *A47J 36/2483* (2013.01); *H05B 6/1209* (2013.01); *A47J 36/34* (2013.01); *H05B 2213/07* (2013.01)

(58) Field of Classification Search
CPC ........ A47J 36/24; A47J 36/2483; A47J 36/34; H05B 6/12; H05B 6/1209
See application file for complete search history.

(56) References Cited

U.S. PATENT DOCUMENTS 9,237,829 B2 * 1/2016 Alet Vidal .......... A47J 43/0465
9,247,850 B2 * 2/2016 Alet Vidal .......... A47J 43/0465
(Continued)

FOREIGN PATENT DOCUMENTS

DE 102008054911 A1 * 6/2010 ............. G08C 17/04
EP 1437332 A1 7/2004
(Continued)

OTHER PUBLICATIONS

PCT International Search Report and Written Opinion dated Apr. 3, 2019 for International Application No. PCT/IB2018/060440 from which the instant application is based, 44 pgs.

*Primary Examiner* — Quang T Van
(74) *Attorney, Agent, or Firm* — Fredrikson & Byron, P.A.

(57) ABSTRACT

A countertop (1) for kitchen furniture comprising a hob (12) with at least one magnetic inductor (14) designed to be used for cooking food and located underneath at least one cooking area (16) of said hob (12), said hob (12) further comprising at least one removable protection element (18) designed to be positioned on top of said at least one cooking area (16). The hob (12) is provided with at least one safety device (20) designed to ensure correct positioning of the at least one removable protection element (18).

19 Claims, 7 Drawing Sheets

(51) Int. Cl.
*H05B 6/10* (2006.01)
*A47J 36/34* (2006.01)

(56) References Cited

U.S. PATENT DOCUMENTS

| | | | |
|---|---|---|---|
| 9,826,576 B2 * | 11/2017 | Yoshino | H05B 6/1209 |
| 10,009,963 B1 * | 6/2018 | Thrun | G06K 7/10366 |
| 2009/0095736 A1 * | 4/2009 | Graber | H05B 6/062 |
| | | | 219/625 |
| 2009/0194526 A1 | 8/2009 | Buchanan | |
| 2010/0000980 A1 * | 1/2010 | Popescu | A47J 36/2466 |
| | | | 219/201 |
| 2018/0110364 A1 * | 4/2018 | Nam | H05B 6/44 |

FOREIGN PATENT DOCUMENTS

| | | | | |
|---|---|---|---|---|
| EP | 3096086 B1 | | 5/2019 | |
| ES | 2645190 A1 | | 12/2017 | |
| JP | S6298589 A | | 5/1987 | |
| JP | 2016201211 A | * | 12/2016 | |
| KR | 20170006767 A | * | 1/2017 | |
| RU | 2544032 C1 | * | 3/2015 | ............ A47B 77/08 |
| WO | 2017052282 A1 | | 3/2017 | |

* cited by examiner

COUNTERTOP WITH INDUCTION HOB

RELATED APPLICATIONS

This application is a 35 U.S.C. 371 national stage filing from International Application No. PCT/IB2018/060440, filed Dec. 20, 2018, which claims priority to Italian Application No. 102017000150969, filed Dec. 29, 2017, the teachings of which are incorporated herein by reference.

The present invention relates to a countertop with an induction hob.

In particular, the present invention relates to the sector of kitchen worktops and induction cooking.

Induction hobs are used to cook food at high temperatures, being normally inserted inside a recess in the kitchen worktop which is made of wood, stone, agglomerate stone, glass ceramic, etc.

A material which is particularly popular because of its aesthetic and structural features is sintered stone such as Lapitec®, an article manufactured in the form of plates consisting of ceramic mineral aggregates with dimensions of less than a few millimetres which are compacted by means of vacuum vibrocompression and sintered, after drying, at temperatures normally above 1000° C.

The induction hobs comprise an actual cooking surface on top of which the metal containers containing the food to be heated are placed, whereby said containers may be pots, pans or the like.

An inductor is positioned underneath the hob, for each heating area, while the induced article consists of said container to be heated, in particular the metal bottom which is sufficiently thick and necessarily made of ferromagnetic material so as to allow heating of the bottom and therefore the food.

As is well known, when the inductor is energized, an electromagnetic field is generated in the induced article, i.e. in the bottom of the container making contact with the overlying surface, as a result of magnetic induction.

The electromagnetic field generates induced currents which, as a result of the Joule effect, heat the bottom of the container. When the bottom of the container is heated, the food contained inside it is heated by means of conduction.

The food therefore is not heated directly (as occurs in the case of microwave ovens), but indirectly.

One of the main advantages of induction hobs is that of allowing energy savings compared to conventional systems such as gas or electric systems.

Moreover, in induction hobs, the cooking surface, since it is not made of electromagnetic material, is not heated directly by the inductor, but is heated by means of thermal induction from the bottom of the pot heated by the inductor.

In this description "pot" will be used to refer to a generic container for cooking food, this term referring not only to pots, but also to pans, etc.

The cooking times for heating the pots are significantly reduced and the response times following a variation in the heat intensity are practically instantaneous.

Moreover, compared to gas cookers:
  there is no danger due to the gas, since they are powered electrically;
  since they are flat, there is no risk of pots being overturned.

The induction surfaces (which are normally made of glass ceramic) are aesthetically attractive and, precisely because they are flat, are fairly easy to clean, even though it is well-known that dirt which is difficult to remove may become lodged in the space between the hob and the countertop inside which it is set.

In order to manufacture these hobs, non-ferromagnetic and therefore non-magnetic materials which have an optimum resistance to high temperatures and low thermal expansion coefficient are used.

It is clear that heating of the hob surface, if excessive, may in any case damage the material, resulting even in breakage thereof.

In particular, with regard to the resistance of the hob surface and its thermal expansion coefficient, the following two factors must be considered:
  the temperatures which the hob surface may reach, and
  the heating ramp, i.e. the variation in temperature as a function of the start-up time, which must be relatively steep so that the operating temperature is reached in a sufficiently short period of time.

It is clear that, the greater the final temperature reached by the surface and the greater the slope of the heating ramp, the greater will be the thermal shocks affecting the hob surface. These shocks generate thermal expansion which could result in breakage of the material. Usually glass ceramic induction hobs have a thickness of about 4.5 mm, which thickness is sufficient for providing the hob with a suitable mechanical strength even at the high temperatures mentioned above.

The induction hobs present on the market are equipped with a control and safety system which prevents operation of the hob when a temperature of the hob surface of 250° C. detected by a temperature probe—for example an NTC (negative temperature coefficient) thermistor located in the centre of the inductor and in contact with the bottom surface of the hob—is reached.

As mentioned above, heating of the hob surface is due to the phenomenon of thermal conduction between the bottom of the pot, which is subject to heating due to the induced currents, and the hob surface itself.

Since the bottom of the pot may reach temperatures higher than 200° C. in particular cooking conditions, the hob surface may also reach these temperatures at the points which make contact with the pot.

Another problem is due to the fact that, once cooking has finished and the pot removed from the hob surface, even though not heated directly, the hob remains in any case hot even for a fairly long period of time.

Therefore, there is the risk, in the event of accidental contact, of a person being scalded since it is not at all obvious that the hob is still hot.

Different solutions have been developed in order to overcome these problems and prevent the material from breaking.

For example, it is known to use removable protection elements (mats) made of insulating material to be positioned between the hob surface and the pot. These mats prevent the bottom of the pot from heating the hob surface, while allowing the bottom of the pot to be heated in any case by means of the inductor.

It is also known to provide continuous countertops in which a zone which may be heated by means of inductors is provided. The main advantage of these countertops is that there are no joints between which stubborn particles of dirt may become lodged.

However, these applications are limited to the heating of pre-cooked food so that normally they operate at fairly low temperatures, normally of less than 100° C.

In fact the use of this solution for the proper cooking of food is not recommended, since the cooking zone is not entirely easy to identify and, moreover, the system could function, even with better operating conditions, without the use of the removable protection element.

The object is to overcome the drawbacks of the prior art.

A first task of the present invention is to be able to provide a continuous countertop with an induction hob, preferably made of Lapitec®, without the risk of the hob breaking or being damaged owing to the high temperatures involved, and where use thereof does not pose any danger for the user.

Another object is to prevent the induction hob from becoming excessively hot during cooking so that, once the container has been removed, the danger of possible scalding following accidental contact is reduced.

The object and the tasks are achieved with a countertop for kitchen units having a hob, a kitchen unit, and a removable protection element, each according to the claims herein.

The advantages and the characteristic features of the present invention will emerge clearly from the detailed description which follows of a number of examples of embodiment, provided by way of a non-limiting example, with reference to the attached drawings in which.

Figure 1:
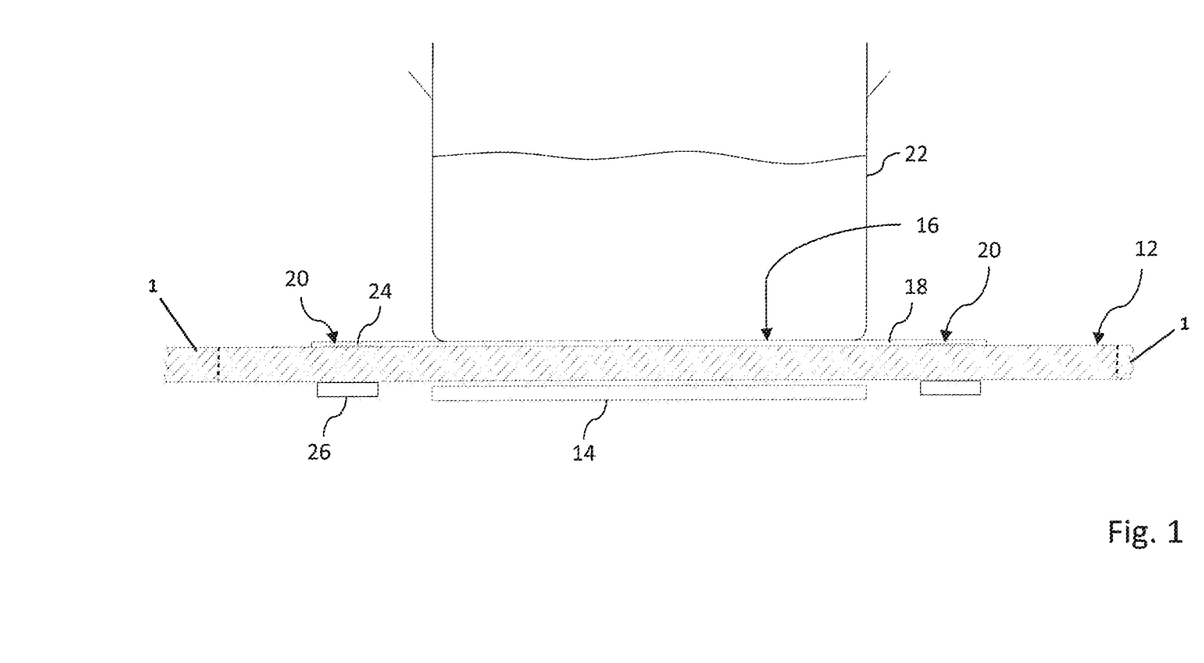
FIG. 1 shows a schematic front view of a possible embodiment of a countertop with an induction hob according to the present invention.
Figure 2:
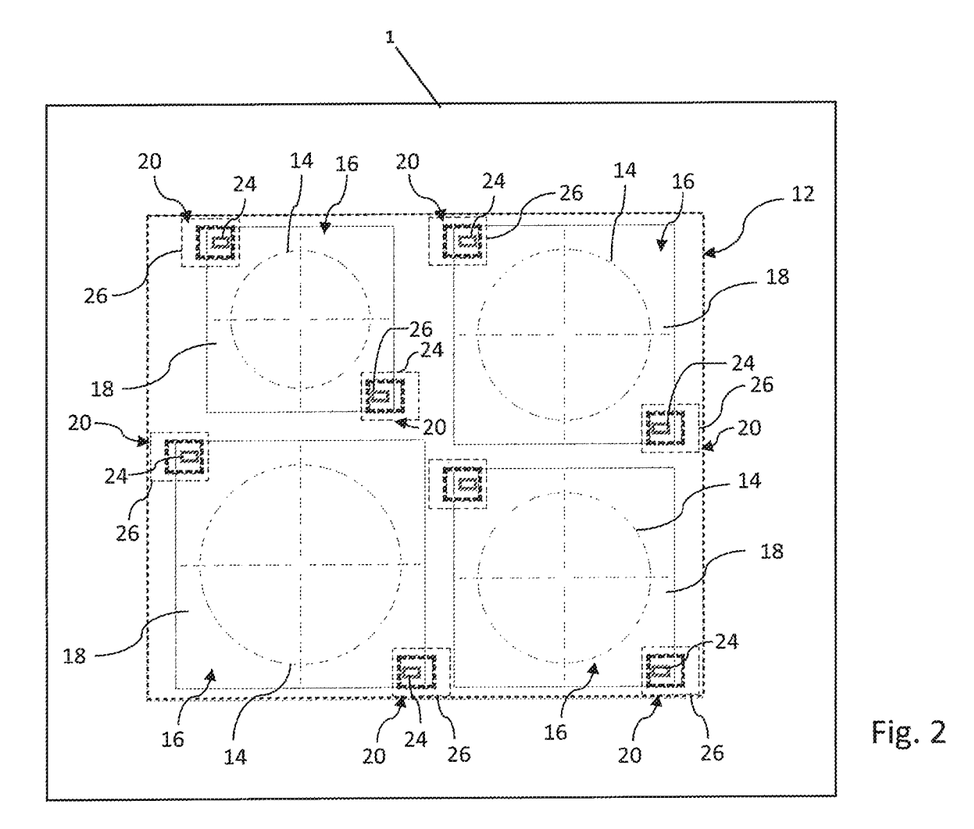
FIG. 2 shows a top plan view of a possible embodiment of the countertop with the hob according to the present invention.

FIGS. 1 and 2 show a countertop 1 with an induction hob 12 for kitchen units according to the present invention.

Even though FIGS. 3-6 show the induction hob 12 separately, it is to be understood that it is intended to be mounted on a countertop 1 of the type shown in FIGS. 1 and 2.

The hob 12 comprises at least one magnetic inductor 14 designed to be used for cooking food and located underneath at least one cooking area 16 of said hob 12, and a removable protection element 18 designed to be positioned on top of said at least one cooking area 16. In accordance with a possible embodiment of the present invention, the magnetic inductor 14 may comprise means for detecting the pot resting on the hob surface, which are designed to transmit this information to a control unit for selectively controlling switching-on of the inductors depending on the form of the surface on which the pot rests.

The hob further comprises at least one safety device 20 designed to ensure the correct positioning of the at least one removable protection element 18.

The purpose of the safety device 20 is to prevent the use of the induction heating at high temperatures without the use of the removable protection element and therefore avoid the risk of accidental damage to the hob surface and injury of the persons using the hob.

Advantageously, the safety device 20 may have a dual function, allowing the electrical power to be supplied only if:

1) the removable protection element 18 has been positioned on the induction surface, and if:
2) the removable protection element 18 is positioned correctly.

Therefore, should the removable protection element 18 not be located over the cooking area 16 or should it not be correctly positioned, the electrical energization of the corresponding magnetic inductor 14 would not be allowed.

In fact, if the removable protection element 18 should not be positioned on the cooking area 16 or should it be positioned incorrectly, the hob 12 would not be suitably insulated and would therefore be heated excessively by the bottom of the pot 22 (shown in FIG. 1) with the risk of breaking or creating danger for the user.

In accordance with a possible embodiment of the present invention, the safety device 20 may use radiofrequency identification, which below will be indicated by the abbreviation RFID (Radio Frequency IDentification). As is known, this technology is based on the identification and/or automatic storage of information relating to objects, based on the capacity for storage of data by particular electronic labels called transponders or tags and on the capacity of the latter to respond to remote interrogation by special fixed or portable apparatus called receivers or readers. This identification is performed by means of radiofrequency, via a receiver is able to read the information contained in the electronic tag interrogated.

As is known, an RFID system consists of three basic elements:

1) a receiver;
2) one or more electronic tags; and
3) a data management information system for transferring data to and from the readers.

The main element which characterizes an RFID system is the electronic tag which comprises:
a microchip containing data in a memory;
an antenna.

In accordance with alternative embodiments it may also comprise a battery if it has an active function rather than a passive function.

In accordance with a possible embodiment of the present invention the removable protection element comprises at least one electronic tag 24, and the hob 12 comprises at least one receiver 26. Advantageously, the at least one receiver may be positioned underneath the hob. Therefore for each electronic tag 24 inserted in the removable protection element 18 there is a corresponding receiver 26 positioned underneath the hob 12 and able to read the respective electronic tag.

In accordance with a possible embodiment of the present invention, a removable protection element 18 may be provided with two electronic tags 24.

FIG. 2 shows a possible embodiment of the hob according to the present invention, provided with four inductors 14, and therefore four cooking areas 16; each cooking area 16 is provided with a removable protection element 18 which has two electronic tags 24. As can be seen from the figure, the electronic tags 24 are combined with two receivers 26 positioned underneath the hob (for this reason they are shown in broken lines).

Two electronic tags 24 are sufficient for positioning the removable protection element because there are only two possible positions of the element on the hob, these being diametrically opposite each other.

In accordance with alternative embodiments of the present invention, the electronic tags 24 for each removable protection element 18 may be three in number, and therefore the hob 12 may be provided with three corresponding receivers 26.

Only when the removable protection element has been placed on top of the hob 12 with its two electronic tags 24 located in the vicinity of the respective receiver 26 located below the hob, is activation of the hob enabled by a control unit (not shown), and the associated magnetic inductor will be energized.

The connections between the receivers and the control unit and the inductors will not be further described since they may be easily realized by the person skilled in the art. Advantageously, the use of several electronic tags and several receivers also allows control of the correct alignment of the removable protection element, and therefore the pot, with the inductor.

In accordance with a possible embodiment of the present invention, in the case of cooking areas 16 of the same size, the two receivers are located in the same relative position, while, in the case of cooking areas 16 of different size, the two receivers are arranged in a different position so as to be able to use the appropriate flat element, eliminating the risk of using an element which is no suitable for a given cooking area.

Therefore the safety device 20 not only has the function of ensuring that the removable protection element 18 has been placed on the induction surface and that it is positioned correctly, but also that the element used is that suitable for a given cooking area 16. The removable protection elements may have different dimensions depending on whether a single cooking area or a set of cooking areas is/are to be protected and enabled.

Figure 3:
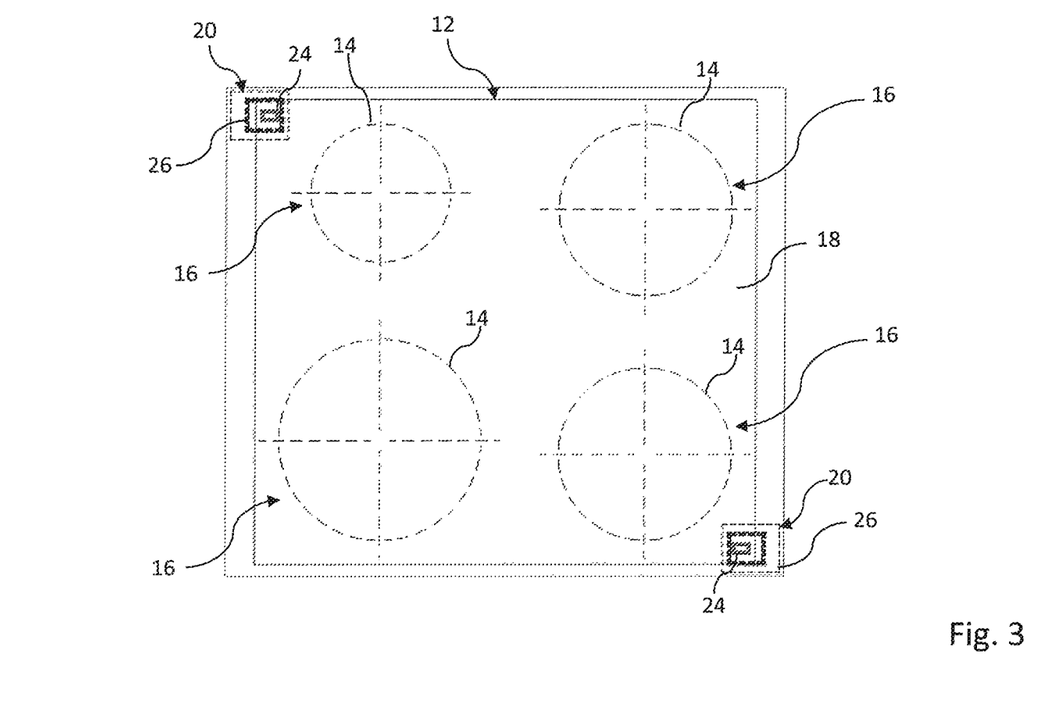
FIG. 3 shows a top plan view of a possible alternative embodiment of the hob designed to be mounted on the countertop according to the present invention.

In the embodiment shown in FIG. 3, the hob 12 is provided with only one removable protection element 18, on top of the four cooking areas 16.

The removable protection element is therefore provided with two electronic tags 24 and the hob is provided with two corresponding receivers 26.

In accordance with a possible embodiment of the present invention, the hob 12 may be provided with a safety system (not shown in the attached figures) which prevents operation of the hob when a maximum temperature of the hob is reached. Advantageously, the hob may comprise an NTC sensor located in the centre of the inductor and in contact with the bottom surface of the hob. The safety system may for example interrupt the electric power supply to the inductors as soon as the temperature detected exceeds a critical maximum temperature which may be for example set at 165° C.

Alternatively, a temperature-sensitive element could be incorporated in the electronic tag so that, if the measured temperature exceeds a limit value, the electric power supply to the cooking area concerned is immediately interrupted.

In accordance with an alternative embodiment of the present invention, the safety device 20 uses NFC (Near Field Communication) technology.

With reference to the removable protection element 18, this is made of non-magnetic material so as to allow the electromagnetic radiation to pass through it and thus heat the container. The material must moreover have a good resistance to high temperatures, since it makes contact with the hot container. Finally, the material must be able to withstand all those substances and liquids, also in a heated state, which could come out of the pots and damage the material. The material must be such as to allow easy washing of the element, preferably in a dishwasher.

As regards the heat insulation, it should be noted that it depends on:
the heat conductivity of the material;
the thickness of the removable flat element.

The degree of insulation obtained with be all the greater the lower the heat conductivity of the material and the greater the thickness (obviously the thickness must be as small as possible so as not limit the effectiveness of the magnetic induction).

In accordance with a possible embodiment of the present invention, materials with a low coefficient of conductivity are used so as to reduce as far as possible the thickness of the removable protection element.

Advantageously, the removable protection element may be made of food-grade silicone. It is known in fact that food-grade silicone has the following properties:
it withstands relatively high temperatures, of up to 230° C.;
it is tested for applications in the food sector;
it has a good chemical resistance, including resistance to acids;
it has a high incision and tear resistance;
it has an optimum ageing resistance; and
it is flexible so that it may be handled and folded without any damage.

Advantageously, the silicone used for manufacture of the removable protection element is characterized by a heat conductivity of about 0.2 Wm-1K-1.

In accordance with a possible embodiment of the present invention, the thickness of the removable protection element may range between 1.8 mm and 2 mm, and is preferably in the region of 1.9 mm.

Moreover, the food-grade silicone used for manufacture of the removable protection element may be washed also in a dishwasher, is foldable and is resistant to temperatures ranging from −60° C. to +230° C.

According to a possible embodiment of the invention, the removable protection element may be made with holes, or shaped or have incisions formed therein.

Figure 4:
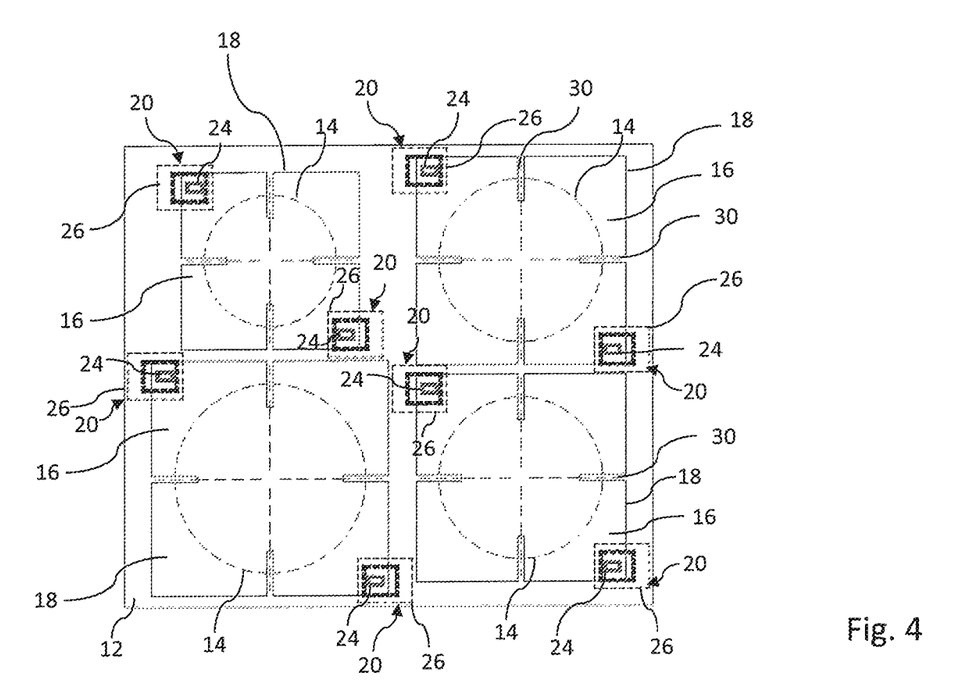
FIG. 4 shows a top plan view of a possible alternative embodiment of the hob designed to be mounted on the countertop according to the present invention.
Figure 5:
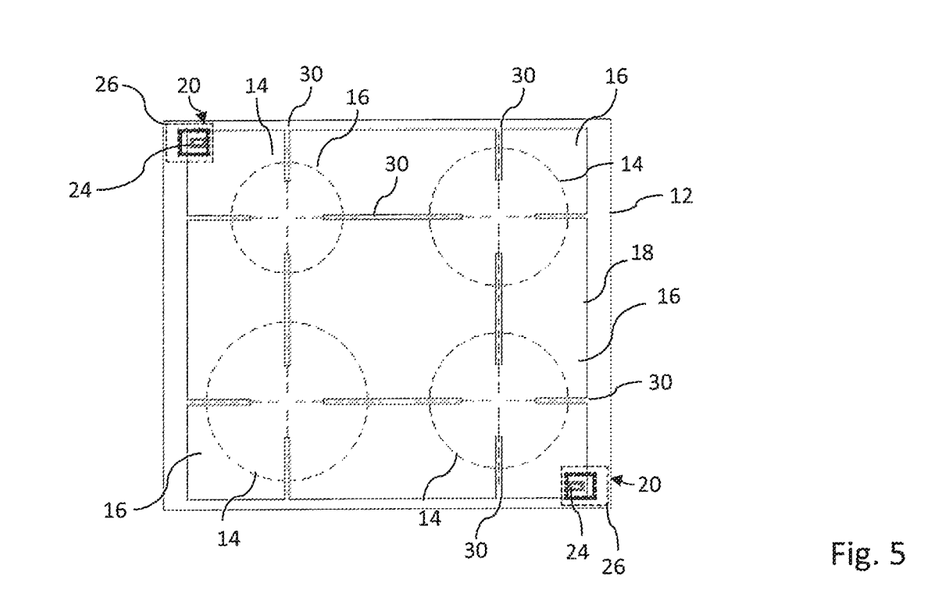
FIG. 5 shows a top plan view of a possible alternative embodiment of the hob designed to be mounted on the countertop according to the present invention.

In the embodiments shown in FIGS. 4 and 5, the protection element comprises incisions 30 which extend radially and are angularly equidistant.

Figure 6:
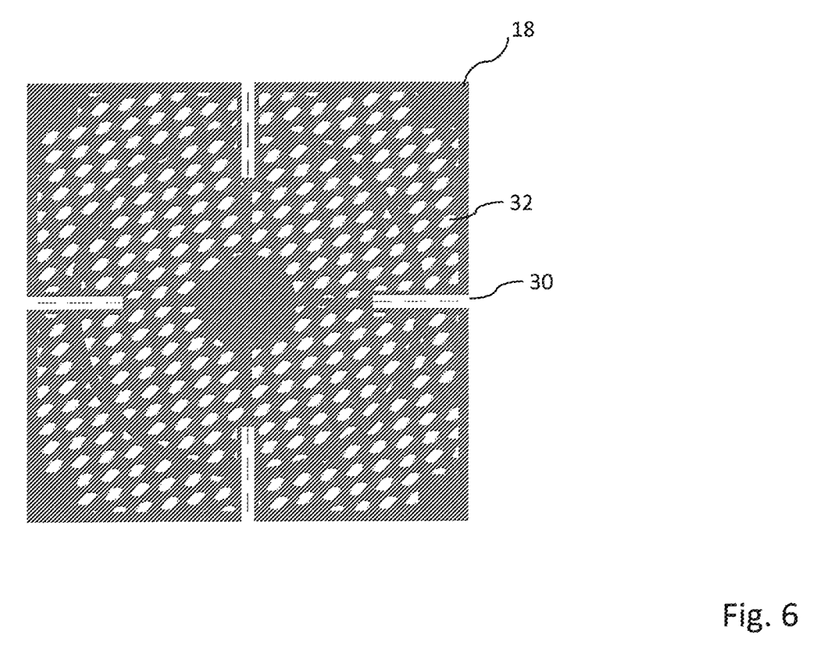
FIG. 6 shows a top plan view of a component of the hob according to the present invention.

In accordance with a possible embodiment shown in FIG. 6, the removable protection element 18 may be formed as a meshwork, i.e. with holes 32 which cover most of its surface. Owing to the incisions, shaped parts or holes, the removable protection element is not deformed and remains flat.

Moreover, air is an optimum insulating material and in particular has a degree of insulation 10 times greater than that of silicone, so that the insulating characteristics of a removable protection element provided with holes are even greater, resulting in the advantage of the hob being heated less.

With a system of this type, it is therefore advantageous to use Lapitec® as the material for manufacture of the continuous countertop 1 with induction hob. Lapitec® is a material which is very popular on the market, with optimum characteristics not only in terms of appearance, but also in terms of resistance to impacts, wear, cutting and acid or corrosive substances, being easy to clean.

Thus, the countertop 1 and the bob 12 may be made as a single sheet of sintered stone, i.e. sheet of Lapitec®.

Advantageously, the sheet of Lapitec® used may have a thickness less than or equal to 22 mm, preferably of between 10 mm and 14 mm, and even more preferably in the region of 12 mm.

Advantageously, it is possible to provide a kitchen furniture, not shown in the figures, comprising a countertop 1 and a hob 12 of the type described above, characterized by the fact that there is continuity of material between the at least one cooking area 16 and the countertop 1.

Moreover, as has been seen, with the hob according to the present invention the risk of scalding in the event of accidental contact with the hob following use is also reduced. It is also possible to use the conventional pots and pans used for induction ovens. Finally, another advantage consists in the use of food-grade silicone which, having been tested for applications in the food sector, may also come into contact with the food without contaminating it. In particular, it may be washed in a dishwasher both because it is resistant to high temperatures and because it does not pose a health hazard, avoiding the release of harmful substances.

Another advantage arises from its good chemical resistance, including its resistance to acids, so that, in the event of spillage of liquids or substances during cooking, it is not altered in any way. Furthermore, owing to the high incision and tear resistance, it may be used in the kitchen without the risk of being damaged. Since it also has an excellent ageing resistance it has a relatively long working life. Finally, since it is flexible, it may be handled and folded without any damage.

In accordance with a possible embodiment of the present invention, the removable protection element may have a variable thickness. For example, it could have a greater thickness in the zones where the temperature reached is higher.

Figure 7:
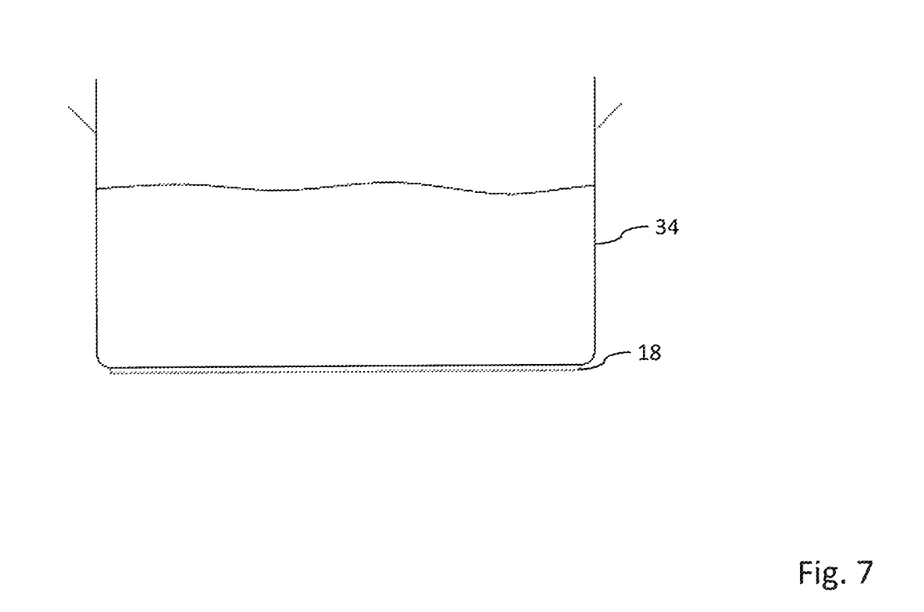
FIG. 7 shows a front view of an alternative embodiment of the hob according to the present invention.

In the case of a removable protection element positioned in a single cooking area, it could be incorporated in the bottom of the pot 34 in order to ensure thermal separation between the bottom of the pot and the hob surface as for example shown in FIG. 7.

Advantageously, the removable protection element could be glued and may then be replaced when worn.

Alternatively, recesses may be provided in the bottom of the pot so that the removable protection element may be partially inserted therein and thus fixed in a removable manner. The person skilled in the art, in order to satisfy specific needs, may make modifications to the embodiments described above and/or replace the elements described with equivalent elements, without thereby departing from the scope of the attached claims.

The invention claimed is:

1. A countertop for kitchen furniture comprising a hob with at least one magnetic inductor used for cooking food and located underneath at least one cooking area of said hob, said hob further comprising at least one removable protection element positioned on top of said at least one cooking area, wherein said hob is provided with at least one safety device designed to ensure correct positioning of the at least one removable protection element and comprising at least one receiver;
   wherein there is continuity of material between the at least one cooking area of said hob and the countertop, the countertop and said hob being made from a single plate of sintered stone;
   wherein the at least one receiver is positioned underneath the single plate plate; and
   wherein the safety device is connected to a control unit which allows power supply only if:
   (1) the removable protection element has been positioned on the induction surface; and
   (2) the removable protection element is positioned correctly.

2. The countertop for kitchen furniture according to claim 1, characterized in that the sintered stone consists of ceramic mineral aggregates with dimensions smaller than a few millimetres, compacted by means of vacuum vibrocompression and sintered, after drying, at temperatures higher than 1000° C.

3. The countertop for kitchen furniture according to claim 1, characterized in that the safety device uses radio frequency RFID or NFC technology.

4. The countertop for kitchen furniture according to claim 3, characterized in that the safety device uses RFID technology and comprises at least one electronic tag provided on the removable protection element.

5. The countertop for kitchen furniture according to claim 4, characterized in that the removable protection element is provided with two electronic tags.

6. The countertop for kitchen furniture according to claim 5, characterized in that the two electronic tags are positioned at the ends of a diagonal of the removable protection element.

7. The countertop for kitchen furniture according to claim 4, characterized in that the hob is provided with a plurality of inductors and therefore a corresponding number of cooking areas;
   each cooking area being provided with a removable protection element provided with two electronic tags which are combined with receivers positioned underneath the hob.

8. The countertop for kitchen furniture according to claim 7, characterized in that cooking areas of the same size have receivers arranged in the same relative position and cooking areas with different dimensions have receivers arranged in different positions so as to be able to use the appropriate removable protection element.

9. The countertop for kitchen furniture according to claim 4, characterized in that only when the removable protection element is positioned on top of the hob with its electronic tags situated in the vicinity of the respective receiver located underneath the hob, the activation of the hob by the control unit is enabled and the associated magnetic inductor will be energized.

10. The countertop for kitchen furniture according to claim 1, characterized in that the removable protection element is made of food-grade silicone.

11. The countertop for kitchen furniture according to claim 1, characterized in that the thickness of the removable protection element is variable and ranges between 1.8 mm and 2 mm.

12. The countertop for kitchen furniture according to claim 1, characterized in that the removable protection element is made with one or more of holes, incisions and shaped parts.

13. The countertop for kitchen furniture according to claim 1, characterized in that the plate used has a thickness which is less than or equal to 22 mm.

14. The countertop for kitchen furniture according to claim 1, characterized in that the removable protection element is incorporated in the bottom of a pot.

15. Kitchen furniture comprising a countertop with a hob according to claim 1, characterized in that there is continuity of material between the at least one cooking area and the countertop.

16. A removable protection element usable with an induction hob of a countertop according to claim 1 and comprising at least one electronic tag of the RFID type.

17. The countertop for kitchen furniture according to claim 1, characterized in that the at least one receiver is secured on the lower surface of the single plate.

18. A countertop for kitchen furniture comprising a hob with at least one magnetic inductor used for cooking food and located underneath at least one cooking area of said hob;
- the countertop comprising an RFID receiver positioned underneath the hob;
- wherein continuity of material exists between the at least one cooking area of said hob and the countertop, the countertop and said hob being made from a single plate of sintered stone; and
- wherein the RFID receiver is positioned underneath the single plate; and
- wherein the safety device is connected to a control unit which allows power supply only if:
  - (1) the removable protection element has been positioned on the induction surface; and
  - (2) the removable protection element is positioned correctly.

19. The countertop for kitchen furniture according to claim 18, characterized in that the at least one receiver is secured on the lower surface of the single plate.

\* \* \* \* \*